United States Patent Office.

GEORGE HAND SMITH, OF CHELSEA, COUNTY OF MIDDLESEX, ENGLAND.

PRODUCING AND FIXING COLORS AND DESIGNS ON SURFACES.

SPECIFICATION forming part of Letters Patent No. 292,222, dated January 22, 1884.

Application filed August 21, 1883. (No specimens.)

*To all whom it may concern:*

Be it known that I, GEORGE HAND SMITH, of Rochester, in the county of Monroe and State of New York, a citizen of the United States of America, residing at Chelsea, in the county of Middlesex, England, doctor of medicine, have invented certain new and useful improvements in the application or production of colors, marks, or designs to or in marble, wood, stone, and other materials; and I do hereby declare the following to be a full, clear, and exact description of the invention, such as will enable others skilled in the art to which it appertains to make and use the same.

In operating upon marble or stone and other materials in the manner described in the specification filed with my application for Letters Patent filed by me on the 20th day of August, 1883, I have found that for certain descriptions of colors it is advantageous to proceed upon a modified course of operation in order to obtain the best results. I first apply these colors, marks, or designs, with which the marble or other object is to be marked or colored in a suitable manner—as, for instance, by hand-printing, stamping, painting, stenciling, or in any well-known way of imparting colors or patterns to the surface of the articles; and then I proceed to heat, without providing any further moisture, in the closed holder or chamber for the desired time, and I then admit vapor into such holder, as described in my said specification, maintaining the increase of temperature of such vapor or atmosphere within such holder, suitably adjusted in advance of the temperature of the articles being treated, until the maximum heat desired to be employed for such treatment has been reached—say, for instance, to a temperature for the articles and the vapor of 200° Fahrenheit. I then close the valves of the holder or operating-chamber, or otherwise cut off further ingress of vapor, and I proceed to lower the temperature of the vapor around the articles into which penetration of the color or marks is desired in properly-adjusted ratio with such articles, either by progressively lowering such temperatures or by effecting such lowering of temperature by stages with intermissions, during which intermissions I maintain the temperature at one point for the desired interval, and then resume the lowering of such temperature. In some cases I can start the operation on the articles (to induce penetration of the colors or marks into the marble or stone or other articles, as described) with both the articles and the liquid to produce vapor cold, and I then raise the temperature gradually of those articles and of the vapor to the desired maximum for that part of the process; and then I proceed to lower those temperatures relatively, so as to produce, by relative differences of temperature, a state of atmosphere around the marble or stone or other material favorable to the penetration of the said colors or coloring or marking matter into such marble or other material; or in some cases, after heating the articles treated in the dry or comparatively dry temperature of the closed holder without access of liquid for a suitable period, I let on or permit access of liquid, and consequently vapor to the contained atmosphere around the articles, the temperature of both articles and vapor being as nearly as possible the same, and I then close such holder against further access of vapor, and the heat applied is so adjusted as to maintain the differential or relative difference of temperature of vapor slightly in advance of the articles treated, which is necessary to the desired production of penetrative action to the color or matter for coloring the marble or other article treated, while at the same time the temperature generally of the whole is being progressively or by stages lowered.

As an instance or example of practicing my invention, I take a piece of marble, which may be three-fourths of an inch in thickness, and I apply to its surface by dipping or coating a solution of copperas, (which may be obtained by producing a saturated solution of that salt in water.) Then the marble is placed in the closed holder or operating-chamber, and allowed to become heated to, say, 200° Fahrenheit, by means of the heat emitted by the water bath. When the marble has been thus heated, then the valve in the bottom of the holder is opened, and excess of vapor, of the description already specified, is permitted to the holder, and the operation of sinking the solution of copperas into the substance of the marble at once commences. The atmosphere of the holder is now slowly descending in the scale of temperature by means of the gradual reduction of the heat supplied to the water bath, causing the slight condensation of moisture around the object required for the process to take place. At the same time it must be understood that this condensation must in no way approach absolute deposition of liquid. This process of reduction may be pursued for, say, twelve (12) hours at a rate of decrease of temperature of from 1° to 2° per hour, care being taken to avoid excessive condensation arising from a too rapid decrease of temperature—that is, supposing the non-conducting properties of the surrounding walls or cells to be perfect. At the end of the operation the copperas will be found to have penetrated the marble for a considerable depth; or, if the operation be sufficiently prolonged, it may pass completely through, and the color produced to the marble will be a beautiful yellow, although the original salt of copperas was of a green tint. Of course, different salts will produce different shades of colors, which will vary with the nature of the coloring-matters.

I claim—

The process herein described of treating marble, stone, or other materials to which have been applied colors or color-producing matters with heat in a chamber, so as to raise the temperature of the atmosphere of the chamber to the desired maximum temperature, and then progressively, or by stages with intermissions during which the temperature is sustained at certain points, lowering such temperature, so as to produce and maintain a state of the atmosphere or vapor around the articles treated productive of penetration of such colors, marks, or devices into the solid, substantially as described.

In testimony whereof I affix my signature in the presence of two witnesses.

GEORGE HAND SMITH.

Witnesses:
ALFRED DONNISON,
ALFRED GEORGE BROOKES.